United States Patent
Zou et al.

(10) Patent No.: US 8,879,185 B1
(45) Date of Patent: Nov. 4, 2014

(54) DISK SYNCHRONOUS WRITE ARCHITECTURE FOR BIT-PATTERNED RECORDING

(75) Inventors: Qiyue Zou, San Jose, CA (US);
Gregory Burd, San Jose, CA (US);
Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 309 days.

(21) Appl. No.: 13/288,276

(22) Filed: Nov. 3, 2011

Related U.S. Application Data

(60) Provisional application No. 61/409,823, filed on Nov. 3, 2010.

(51) Int. Cl.
*G11B 5/09* (2006.01)
(52) U.S. Cl.
USPC .................. 360/51; 360/26; 360/31; 360/48; 360/75; 360/77.02
(58) Field of Classification Search
None
See application file for complete search history.

(56) References Cited

U.S. PATENT DOCUMENTS

| | | | | |
|---|---|---|---|---|
| 5,315,571 A * | 5/1994 | Maeda et al. | ............... | 369/47.41 |
| 6,222,692 B1 * | 4/2001 | Shrinkle | ............... | 360/51 |
| 6,934,099 B2 * | 8/2005 | Oda et al. | ............... | 360/27 |
| 7,675,703 B2 * | 3/2010 | Albrecht et al. | ............... | 360/51 |
| 8,174,949 B2 * | 5/2012 | Ratnakar Aravind | ...... | 369/59.19 |
| 8,199,868 B2 * | 6/2012 | Aoyama | ............... | 375/373 |
| 8,331,050 B1 * | 12/2012 | Zou et al. | ............... | 360/51 |
| 8,755,139 B1 * | 6/2014 | Zou et al. | ............... | 360/51 |
| 2002/0021519 A1 * | 2/2002 | Rae | ............... | 360/51 |
| 2004/0201913 A1 * | 10/2004 | Sutardja | ............... | 360/51 |
| 2010/0073801 A1 * | 3/2010 | Itakura | ............... | 360/51 |
| 2010/0118426 A1 * | 5/2010 | Vikramaditya et al. | ......... | 360/51 |
| 2010/0182713 A1 * | 7/2010 | Gao et al. | ............... | 360/55 |
| 2010/0202079 A1 * | 8/2010 | Buch et al. | ............... | 360/51 |

* cited by examiner

*Primary Examiner* — Dismery Mercedes

(57) ABSTRACT

Systems, methods, apparatus, and techniques are provided for controlling synchronization of a write clock. A frequency offset is estimated based, at least partially, on a location of the servo synchronization marker to produce the frequency offset estimate. A phase correction value and a frequency correction value associated with the write clock are obtained, and a data clock timing control signal is produced based on the frequency offset estimate, the phase correction value, and the frequency correction value. The data clock timing control signal is applied to a phase interpolator to modify a phase of the write clock.

20 Claims, 6 Drawing Sheets

DISK SYNCHRONOUS WRITE ARCHITECTURE FOR BIT-PATTERNED RECORDING

CROSS REFERENCE TO RELATED APPLICATION

This application claims the benefit under 35 U.S.C. §119 (e) of U.S. Provisional Application No. 61/409,823, filed Nov. 3, 2010, which is incorporated herein by reference in its respective entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Continuous media recording systems write data to a disk in a continuous pattern. Prior to a write operation, servo sector information (e.g., preamble data, synchronization markers, and positioning information) is read from the disk. The servo sector information is used to position a read/write head and to correct head positioning error. Subsequent to correcting head positioning error, data is written to sectors of the disk at a desired position. When data is written to the disk in a continuous pattern, the data may be written generally at any point within a sector of the disk.

Bit-patterned media (BPM) recording systems provide increased storage capacity over continuous media recording systems. For example, BPM recording systems may store ten times more information on a magnetic storage device (e.g., a magnetic disk or hard disk) than continuous media recording systems. As an example, a BPM recording system may store 1 or more terabits (Tbit) of data in one square inch (in$^2$) of a magnetic storage device.

BPM recording systems write data to a disk in discontinuous island-based patterns. Bits of data are stored at specific points or discrete bit islands on the disk. For example, each bit island may store 1 bit of data. Head positioning accuracy requirements of BPM recording systems are more stringent than those of continuous media recording systems. This assures that data is written over bit island areas of the disk while minimizing and/or avoiding attempts to write data over areas between bit islands.

A BPM recording system may include both a servo clock and a write clock. The servo clock may be used for timing read events of servo sector information from the disk. The write clock may be used for timing write events including data write or switching timing of a write head. Synchronization of the write clock with the patterned media is needed in a BPM recording system due to the discontinuous format of BPM. A write clock signal is synchronized when rising and/or falling edges of the write clock signal are aligned with start and end positions of the bit islands, such that writing occurs over the bit islands and not over areas between bit islands.

In a continuous media recording system, head positioning error is corrected prior to writing to a disk. A continuous media recording system may include a servo clock and a write clock. The servo clock is used for timing read events of servo sector information. The write clock is used for timing write events. Positioning of bits on the disk is defined by the positioning of the write head during the write process. A first order or second order phase lock loop (PLL) may be used to control and correct the frequency of the servo clock. The frequency of the write clock may be adjusted using open loop control by mirroring the corrections to the servo clock. The mirrored corrections may include frequency and phase adjustments.

A BPM recording system may also include a servo clock and a write clock. Timing requirements of (head) positioning are more stringent in BPM recording systems than continuous media recording systems due to the discontinuous island-based patterns (or separations between bit islands). Deviation in frequency and phase of a write clock can cause misalignment between write clock pulses and bit islands. A write clock signal is aligned with bit islands when rising and/or falling edges of the write clock signal are synchronized with starting edge and ending edge positions of the bit islands. A read/write head is synchronized with bit islands when the read/write head is positioned over a starting edge of a bit island and begins writing at the starting edge when a rising edge of a write clock signal occurs. Write clock synchronization and/or write head synchronization with bit islands prevents writing attempts over areas between bit islands. The areas between the bit islands may be non-magnetic areas or grooves (i.e. the bit islands may be separated by non-magnetic materials).

In a BPM recording system, write clock/bit island misalignment and/or loss in write clock synchronization can lead to writing errors. The writing errors can be difficult to detect and/or correct.

SUMMARY

Described herein is synchronization circuitry including frequency offset circuitry and data timing circuitry. The frequency offset circuitry produces a frequency offset estimate based, at least partially, on a location of a servo synchronization marker. The data timing circuitry is coupled to the frequency offset circuitry and receives the frequency offset estimate from the frequency offset circuitry. The data timing circuitry obtains a phase correction value and a frequency correction value and produces a data clock timing control signal based on the frequency offset estimate, the phase correction value, and the frequency correction value. The data timing circuitry applies the data clock timing control signal to a phase interpolator to modify a phase of a write clock.

In certain implementations of the synchronization circuitry, the frequency offset circuitry includes a disk synchronous write loop filter that provides a first estimate of the frequency offset, a register that stores a second estimate of the frequency offset, and phase adjustment computation circuitry to linearly weigh the first estimate of the frequency offset and the second estimate of the frequency offset to produce the frequency offset estimate. In certain implementations of the synchronization circuitry, the data clock timing control signal is configured to digitally modify the phase of the write clock and/or the write clock is derived from a voltage controlled oscillator.

In certain implementations, the synchronization circuitry further includes calibration circuitry to determine a time delay associated with signal propagation through a read path and a write path, and update values of the phase correction value based on the time delay. In certain implementations, the synchronization circuitry further includes protocol circuitry to change a mode of the synchronization circuitry among a type-1 bit-patterned media write mode, a type-2 bit-patterned media write mode, and a continuous media write mode.

Also described herein are techniques for controlling synchronization of a write clock. A location of a servo synchronization marker is determined, and a frequency offset is estimated, based, at least partially, on the location of the servo synchronization marker to produce a frequency offset estimate. A phase correction value and a frequency correction value associated with the write clock are obtained, and a data clock timing control signal is produced, based on the frequency offset estimate, the phase correction value, and the frequency correction value. The data clock timing control signal is applied to a phase interpolator to modify a phase of the write clock.

In certain implementations of these techniques, a first estimate of the frequency offset and a second estimate of the frequency offset are obtained, where the second estimate of the frequency offset is based on a repeatable run-out model. The first estimate of the frequency offset and the second estimate of the frequency offset are linearly weighed to produce the frequency offset estimate. In certain implementations of these techniques, a phase correction value and a frequency correction value are programmably adjusted based on a measured time delay.

In certain implementations of these techniques, the write clock is derived from a voltage controlled oscillator and a phase associated with the write clock is digitally adjusted based on the data clock timing control signal. In certain implementations of these techniques, a time delay associated with signal propagation through a read path and a write path is determined, and the phase correction value and the frequency correction value are updated based on the time delay.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

In the following description, implementations are disclosed that precisely align write clock pulses with bit islands. This alignment provides write clock and write head synchronization with bit islands.

Figure 1:
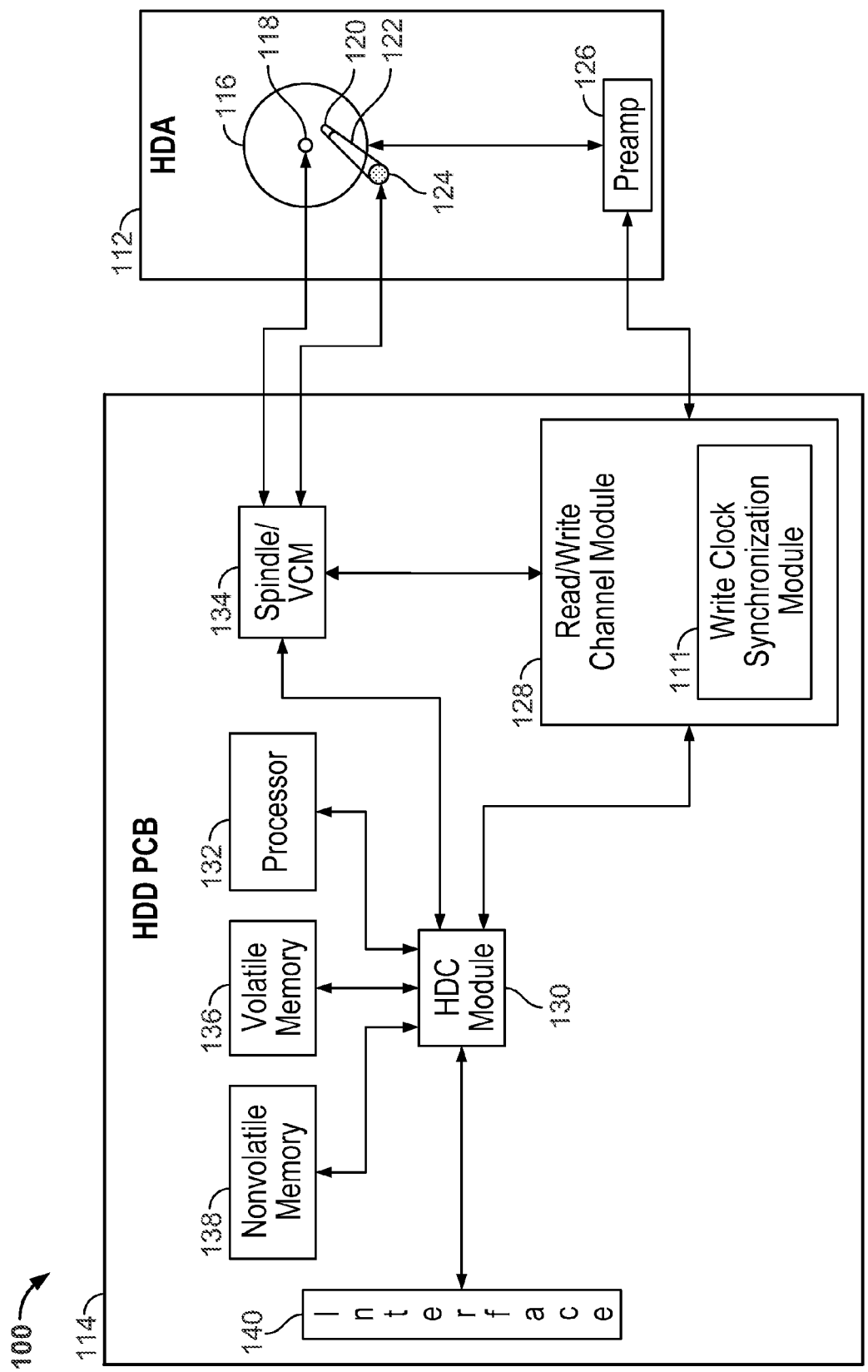
FIG. 1 illustrates a hard disk drive (HDD) system incorporating a write clock synchronization system in accordance with an embodiment of the present disclosure.

FIG. 1 illustrates a HDD system 100 incorporating a write clock synchronization system 111 in accordance with an embodiment of the present disclosure. The HDD system 100 includes a hard disk assembly (HDA) 112 and a HDD printed circuit board (PCB) 114. The HDA 112 includes one or more circular platters (i.e. disks) 116, which have magnetic surfaces that are used to store data magnetically. Data can be stored in either a continuous media format or BPM format on the disks 116. The disks 116 are arranged in a stack, and the stack is rotated by a spindle motor 118. At least one read and write head (hereinafter, "head") 120 reads data from and writes data on the magnetic surfaces of the disks 116.

The head 120 includes a write element, such as an inductor, that generates a magnetic field and a read element, such as a magneto-resistive (MR) element, that senses the magnetic field on the disks 116. The head 120 is mounted at a distal end of an actuator arm 122. An actuator, such as a voice coil motor (VCM) 124, moves the actuator arm 122 relative to the disks 116.

The HDA 112 includes a preamplifier device 126 that amplifies signals received from and sent to the head 120. The preamplifier device 126 generates a write current that flows through the write element of the head 120 when writing data. The write current is used to produce a magnetic field on the magnetic surfaces of the disks 116. Magnetic surfaces of the disks 116 induce low-level analog signals in the read element of the head 120 during reading of the disks 116. The preamplifier device 126 amplifies the low-level analog signals and outputs amplified analog signals to a read/write channel module 128.

The HDD PCB 114 includes the read/write channel module 128, a hard disk controller (HDC) 130, a processor 132, a spindle/VCM driver module 134, volatile memory 136, nonvolatile memory 138, and an input/output (I/O) interface 140. The read/write channel module 128 includes the write clock synchronization module 111. The write clock synchronization system 111 synchronizes write clock signals with synchronization markers in servo sector regions of the disks 116 and/or synchronizes write clock signals with discontinuous bit islands on the disks 116. The write clock synchronization system 111 estimates phases of servo clock signals and write clock signals at certain times. Based on the estimates, the write clock signals are close-loop controlled and aligned with bit islands.

During write operations, the read/write channel module 128 may encode the data to increase reliability by using error-correcting codes (ECC) such as run length limited (RLL) code, Reed-Solomon code, etc. The read/write channel module 128 then transmits the encoded data to the preamplifier device 126. During read operations, the read/write channel module 128 receives analog signals from the preamplifier device 126. The read/write channel module 128 converts the analog signals into digital signals, which are decoded to recover the original data.

The HDC module 130 controls operation of the HDD system 100. For example, the HDC module 130 generates commands that control the speed of the spindle motor 118 and the movement of the actuator arm 122. The spindle/VCM driver module 134 implements the commands and generates control signals that control the speed of the spindle motor 118 and the positioning of the actuator arm 122. Additionally, the HDC module 130 communicates with an external device (not shown), such as a host adapter within a host device, via the I/O interface 140. The HDC module 130 may receive data to be stored from the external device, and may transmit retrieved data to the external device.

The processor 132 processes data, including encoding, decoding, filtering, and/or formatting. Additionally, the processor 132 processes servo or positioning information to position the head 120 over the disks 116 during read/write operations. Servo, which is stored on the disks 116, ensures that data is written to and read from correct locations on the disks 116.

Figure 2:
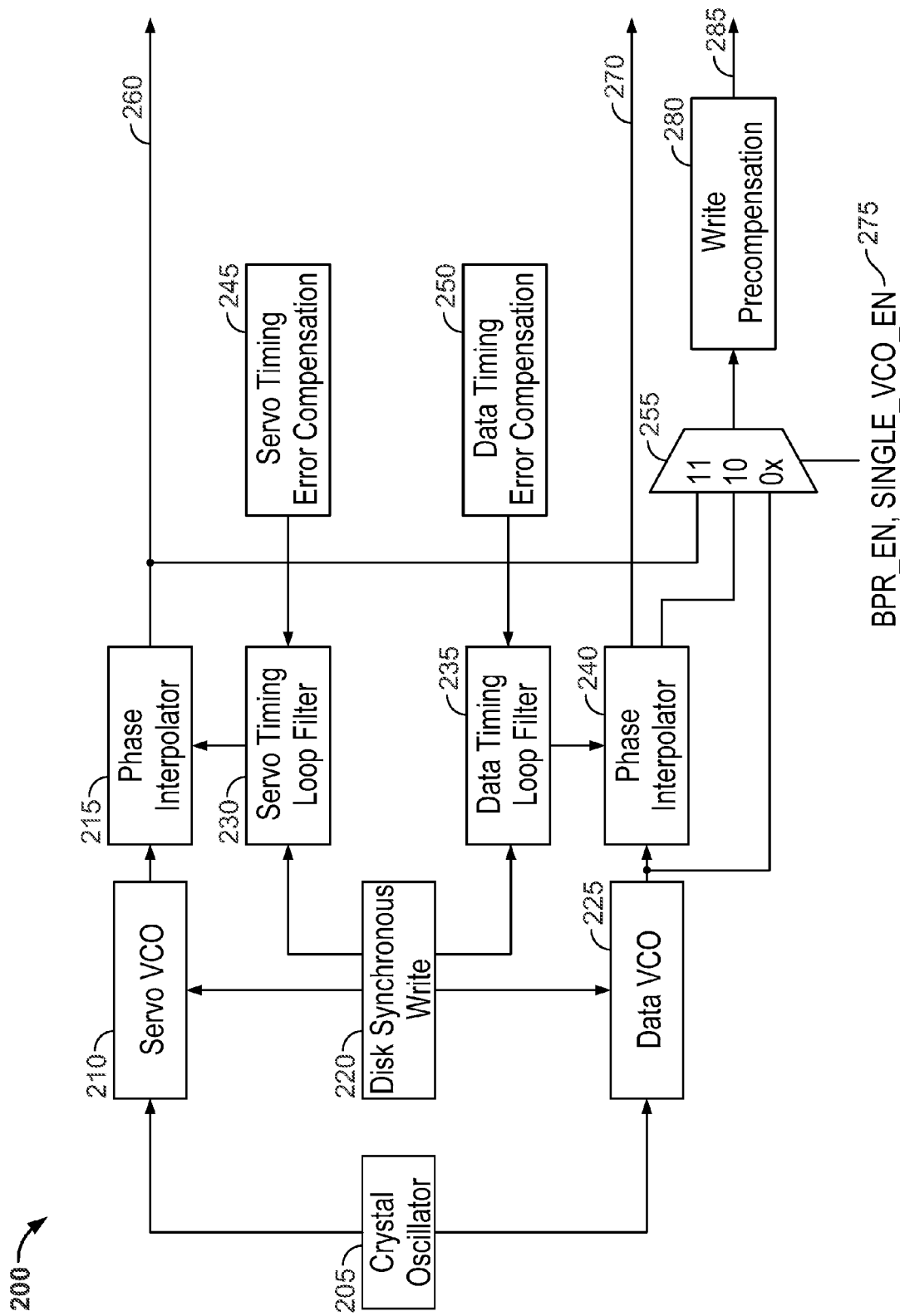
FIG. 2 illustrates a multiprotocol write architecture in accordance with an embodiment of the present disclosure.

FIG. 2 illustrates a multiprotocol write architecture in accordance with an embodiment of the present disclosure. Architecture 200 is a more detailed illustration of certain components included in write clock synchronization module 111. The architecture 200 generates read, write, and servo clocks. The architecture 200 is adaptive to generate clock signals for continuous media, type-1 BPM recording, or type-2 BPM recording depending on the state of certain configuration variables. In a type-1 BPM operational mode, the servo and write clocks output by the architecture 200 have the same clock frequency, while in a continuous media or type-2 BPM operational mode, the servo and write clocks have different frequencies.

A crystal oscillator 205 generates a precise electrical oscillatory signal from which other clock signals used by the architecture 200 are derived. In certain implementations, the crystal oscillator 205 may be a quartz-based crystal operating at or around a frequency of 20 MHz.

Servo VCO 210 derives a base servo clock signal from the crystal oscillator 205 and data VCO 225 derives a data clock signal from the crystal oscillator 205. Each of the servo VCO 210 and the data VCO 225 may use a phase-locked loop or similar circuitry to achieve synchronization with the crystal oscillator 205. In addition, each of the servo VCO 210 and data VCO 225 may adjust for frequency errors, e.g., frequency "jitter," based on signals received from disk synchronous write module 220.

Servo timing error compensation module 245 and data timing error compensation module 250 are used to determine and adjust for phase errors in servo and data clock signals, respectively. In certain implementations, servo timing module 245 may generate, or retrieve from storage, or otherwise determine compensatory parameters to be applied to a base servo clock signal. The compensatory parameters may be filtered by servo timing loop filter 230 to produce an output that can be used to control a phase interpolator 215. Specifically, the phase interpolator 215 may adjust the phase of the signal at the output of the servo VCO 210 by a fine and/or discrete amount to compensate for errors detected by the servo timing error compensation module 245.

Similarly, the data timing error module 250 may obtain one or more compensatory parameters to be applied to a base data clock signal. The compensatory parameters may be filtered by the phase interpolator 240, the output of which may be used to adjust the phase of the signal at the output of the data VCO 225 by a fine and/or discrete amount to compensate for errors detected by the data timing error compensation module 250.

Multiplexer 255 selectively passes the output of the phase interpolator 215, the data VCO 225, or the phase interpolator 240 according to whether the architecture 200 is configured to operation in a continuous media, type-1 BPM, or type-2 BPM recording mode. In particular, the multiplexer 255 passes data according to parameters BPR_EN and SINGLE_VCO_EN, which are applied via input 275. In each operational mode, the servo clock is provided by output 260, the data read clock is provided by output 270, and the data write clock is provided by the output 285. However, the nature of the signals provided on outputs 270 and 285 depend on the operational mode, as described below.

In the continuous media recording mode, the parameter BPR_EN is set equal to the value 0. In this mode, the output of the data VCO 225 is passed by the multiplexer 255 to the write precompensation module 280, which performs write precompensation, e.g., to account for a differing magnetic field strength at different positions of the write media. The signal output by write precompensation module 280 is used as the data write clock at output 285. In this operational mode, the output of the data VCO 225 is also passed to phase interpolator 240, and the output of the phase interpolator 240 is used as the data read clock at output 270.

In a type-1 or type-2 BPM operational mode, the parameter BPR_EN is set equal to the value 1. In the type-1 BPM operational mode, the data and servo clocks may operate according to the same phase and/or frequency characteristics. In this mode, the parameter SINGLE_VCO_EN is set to the value 1 and the output from phase interpolator 215, derived from servo VCO 210, is provided as input to the write precompensation module 280. The output of the write precompensation module 208 is then provided as the data write clock at output 285.

In the type-2 BPM operation mode, the output of the phase interpolator 240 provides a servo clock. In particular, the parameter SINGLE_VCO_EN is set to the value 0 and the output from phase interpolator 240 is provided as input to the write precompensation module 280. The output of the write precompensation module 208 is then provided as the data write clock at output 285. The output 270 provides the data read clock in type-1 BPM, type-2 BPM, and continuous media operational modes.

Figure 3:
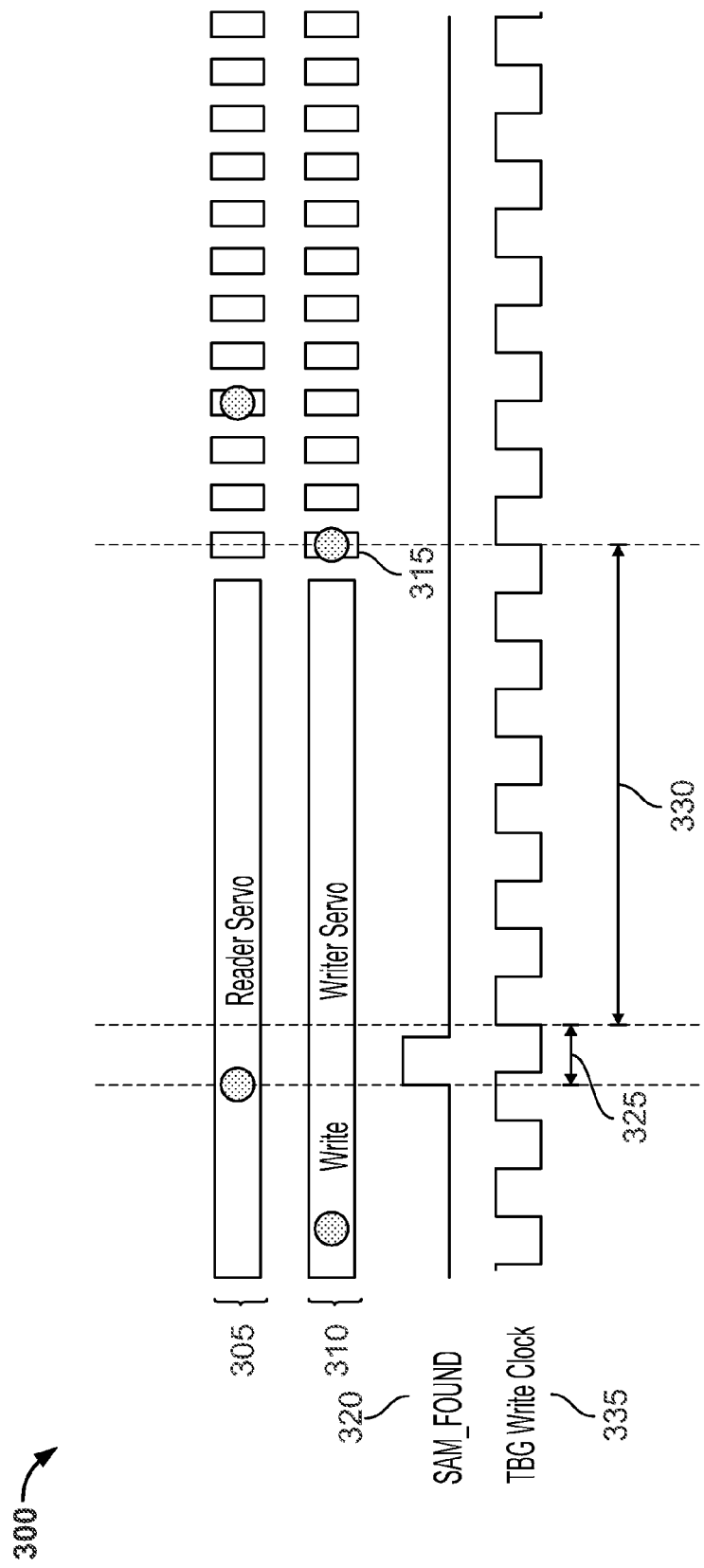
FIG. 3 illustrates a phase synchronization protocol and phase synchronization parameters used by the write clock synchronization module in accordance with an embodiment of the present disclosure.

FIG. 3 illustrates a phase synchronization protocol and phase synchronization parameters used by write clock synchronization module 111 in accordance with an embodiment of the present disclosure. Protocol 300 may be implemented in the firmware, through circuitry, or through a combination of circuitry and firmware. The protocol 300 illustrates how write clock synchronization module 111 achieves phase synchronization with media, e.g., in a type-1 BPM or type-2 BPM operational mode.

As illustrated in FIG. 3, tracks 305 and 310 represent two tracks, each containing servo and data regions. Some of the magnetic bit islands of a single data region are explicitly shown in FIG. 3 for each of the tracks 305 and 310. The write element of head 120 is used to write data on the track 310 starting with magnetic bit island 315 and the write element of head 120 must therefore be precisely aligned with the location of the magnetic bit island 315 when writing starts. Ideally, a writing edge of the write clock, TBG_write_clock 335, should be aligned with the starting left edge of the magnetic bit island to which data is being written, e.g., the magnetic bit island 315 as illustrated in FIG. 3.

Synchronization of the write element of head 120 and the magnetic bit island 315 is achieved, in part, using the read element of head 120. Due to physical configuration, the read element of head 120 is located on the track 305 and with a different relative location within the track compared to the write element of head 120. In particular, the protocol 300 utilizes synchronization information obtained from reading servo data from the track 305 to write bits directly to the bit islands of the track 310. Specifically, the data of the read element of head 120 is monitored until a synchronization marker in servo data is found. In certain implementations, signal SAM_FOUND 320 is approximately a pulse wave that is asserted high when a synchronization marker is found, as illustrated in FIG. 3.

Once a synchronization marker is found, write clock synchronization module 111 retrieves, accesses, or otherwise obtains relevant timing parameters from memory (e.g., stored in registers within write clock synchronization module 111). In an implementation, parameters GATE_PHASE and CLOCK_CYCLES are obtained. The parameter GATE_PHASE represents a phase offset from an actual phase value of TBG_Write_Clock 335 at the time of assertion of the signal SAM_FOUND 320 and the expected value of the write clock phase at that time, expressed as a fraction of the length of a full clock cycle.

The parameter CLOCK_CYCLES represents a number of clock cycles between the next assertion of the write clock signal TBG_Write_Clock 335 and the assertion of the write clock signal TBG_Write_Clock 335 corresponding to the magnetic bit island 315. For example, in FIG. 3, CLOCK_CYCLES is the integer value corresponding to the number of clock cycles represented by a length 330 in FIG. 3. In a preferred embodiment, the values of the parameters GATE_PHASE and CLOCK_CYCLES are stored and determined separately for each wedge or track of media. This allows for variations in the physical media and operational aspects of HDD system 100.

Some synchronization parameters are determined in a manufacturing environment prior to the deployment of HDD system 100. For example, initial or baseline values of GATE_PHASE and CLOCK_CYCLES may be determined upon manufacturing of part of HDD system 100. However, the parameters GATE_PHASE and CLOCK_CYCLES are preferably user programmable via calibration to account for aging of equipment, variations in circuitry delay, operating temperature, and other relevant factors that affect synchronization during field use.

Figure 4:
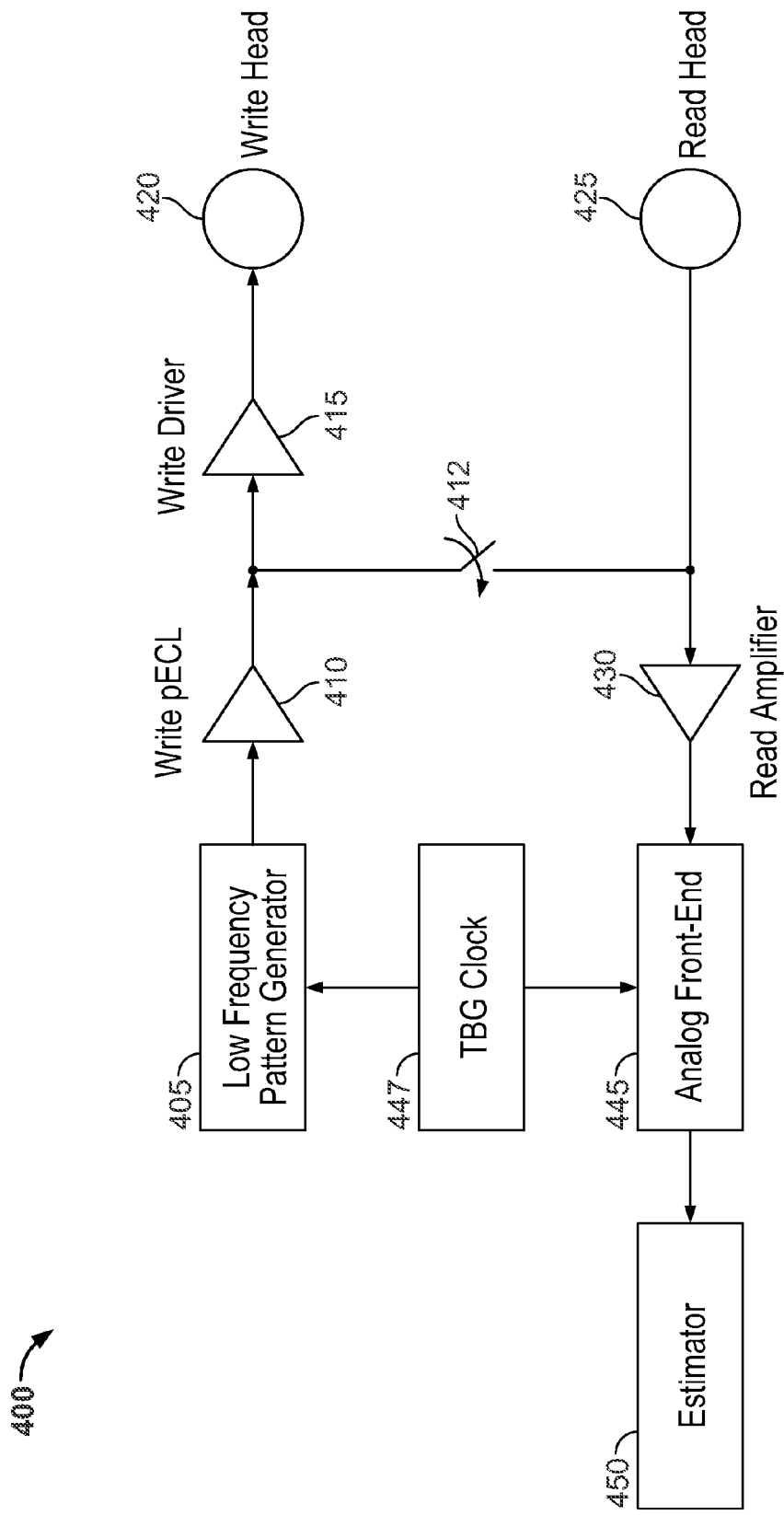
FIG. 4 illustrates circuitry for obtaining phase synchronization parameters by a user of the HDD system in accordance with an embodiment of the present disclosure.

FIG. 4 illustrates circuitry 400 for obtaining phase synchronization parameters by a user of HDD system 100 in accordance with an embodiment of the present disclosure. The circuitry 400 is included within the read channel path of HDD system 100. The circuitry 400 may be used to determine synchronization parameters GATE_PHASE and CLOCK_CYCLES periodically during or prior to run-time operation of HDD system 100. Specifically, switch 412 is open during normal operation of HDD system 100 and data is written to, and read from, media as normal. On the other hand, HDD system 100 may periodically calibrate by closing the switch 412. In the calibration mode, the time required for a test pattern to propagate through the read path and the write path of the circuitry 400 is measured.

In particular, in the calibration mode, low-frequency pattern generator 405 generates a periodic and known low-frequency data pattern. The switch 412 may be selectively closed according to a binary-valued firmware variable. The closing of the switch 412 electrically shorts the read-write path of the circuitry 400 and the output from the write pECL 410 is provided as input to the read amplifier 430, i.e., rather than proceeding to write driver 415 and the write element of head 120. The output of the read amplifier 430 is provided to analog front-end 445. Thus, the signal propagated through the circuitry 400 does not reach the read element 425 in the calibration mode.

The analog front-end 445 is driven by the same clock as the low-frequency pattern generator 405, i.e., data clock 447. Hence, the analog front-end 445 may precisely measure the time delay created by the shorted read-write path of the circuitry 400. This output of the analog front-end 445 is provided to estimator 450, which estimates relevant synchronization parameters. In certain implementations, the estimator 450 estimates parameters GATE_PHASE and CLOCK_CYCLES and provides these values as output for storage in registers of write clock synchronization module (not pictured in FIG. 4).

Figure 5:
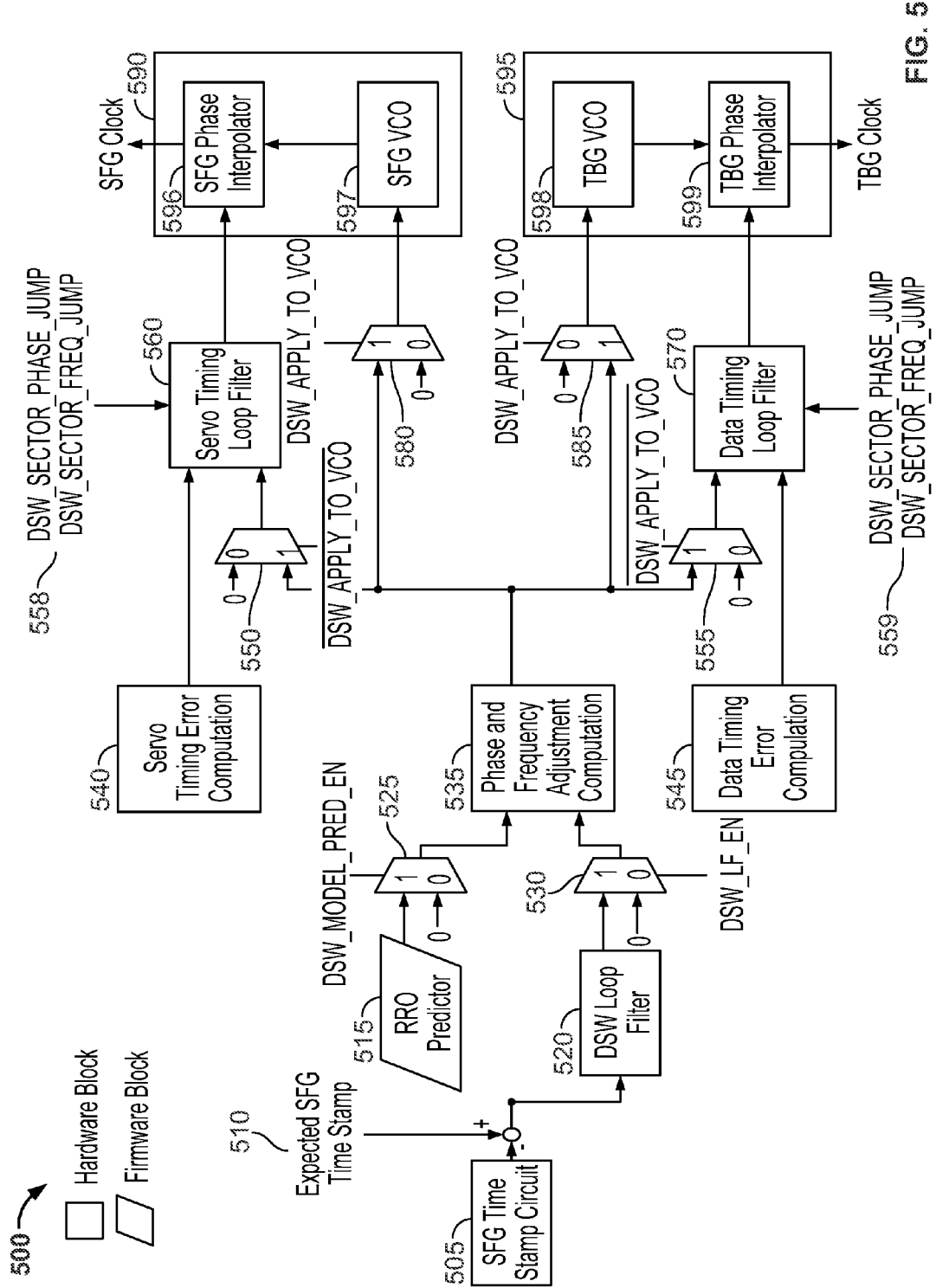
FIG. 5 illustrates circuitry outputting a servo frequency generator clock and time based generator clock signals in accordance with an embodiment of the present disclosure.

FIG. 5 illustrates circuitry outputting servo clock and data clock signals in accordance with an embodiment of the present disclosure. Circuitry 500 may be included as a part of write clock synchronization module 111. The circuitry 500 implements digital phase adjustments to servo clock and data clock-based phase oscillators to create servo and data clocks, respectively. Further, the circuitry 500 is capable of applying phase adjustments directly to voltage controlled oscillators corresponding to the servo clock and data clocks in an analog fashion.

Servo clock time stamp circuit 505 measures a time difference between consecutive synchronization markers in different servo wedges of a given track of media. This time difference is compared to an expected time difference between adjacent servo wedges at expected time stamp module 510 to produce a frequency error value. The frequency error value, which may itself be in the form of a time difference, is provided to DSW loop filter 520 to produce a frequency offset estimate. In particular, one or both of the repeatable run-out (RRO) predictor 515 and the DSW loop filter 520 may be enabled according to multiplexer 525 and multiplexer 530, respectively. Specifically, parameter DSW_MODEL_PRED_EN is set to a value of 1 if the RRO predictor 515 is to be enabled and to a value of 0 otherwise, while DSW_LF_EN is set to a value of 1 if the DSW loop filter 520 is to be enabled and to a value of 0 otherwise. The outputs of one or both of the RRO predictor 515 and the DSW loop filter 520 are provided to phase and frequency adjustment computation module 535. The phase and frequency adjustment computation module 535 combines the outputs of the RRO predictor 515 and the DSW loop filter 520 (if both of these modules are enabled) to produce a single estimate for the value of frequency offset.

In an advantageous implementation of the circuitry 500, phase adjustment is performed using a digital approach in which phase adjustments are applied to servo clock phase interpolator 596 and data clock phase interpolator 599, respectively. In this mode of operation, the firmware variable DSW_APPLY_TO_VCO is set to the value 0 and multiplexers 580 and 585 are effectively disabled. Further, the output of the phase and frequency adjustment computation module 535 is provided, via multiplexers 550 and 555, to servo timing loop filter 560 and data timing loop filter 570, respectively.

The servo timing loop filter 560 receives input from servo timing error computation module 540 and applies stored "base" values of phase and frequency offset via input 558. From these inputs, the servo timing loop filter 560 computes a data control signal that may be used to precisely adjust the phase and frequency of the clock signal produced by servo VCO 597. In particular, the servo timing loop filter 560 provides this timing signal directly to the phase interpolator 596. The output of the phase interpolator 596 is a phase and frequency synchronized write signal that may be used to write data to media in HDD system 100.

The data timing loop filter 570 receives input from data timing error computation module 545 and applies stored "base" values of phase and frequency offset via input 559. From these inputs, the data timing loop filter 570 computes a data control signal that may be used to precisely adjust the phase and frequency of the clock signal produced by timing based generator VCO 598. In particular, the data timing loop filter 570 provides this timing signal directly to the phase interpolator 599. The output of the phase interpolator 599 is a phase and frequency synchronized write signal that may be used to write data to media in HDD system 100.

If, on the other hand, DSW_APPLY_TO_VCO is set equal to the value 1, then phase adjustments are made directly to the servo VCO 597 and the data VCO 598. In these implementations, the phase adjustments may produce transient effects that produce frequency distortions in the output clock signals clock 590 and clock 595, which is not appropriate for bit-patterned media.

Figure 6:
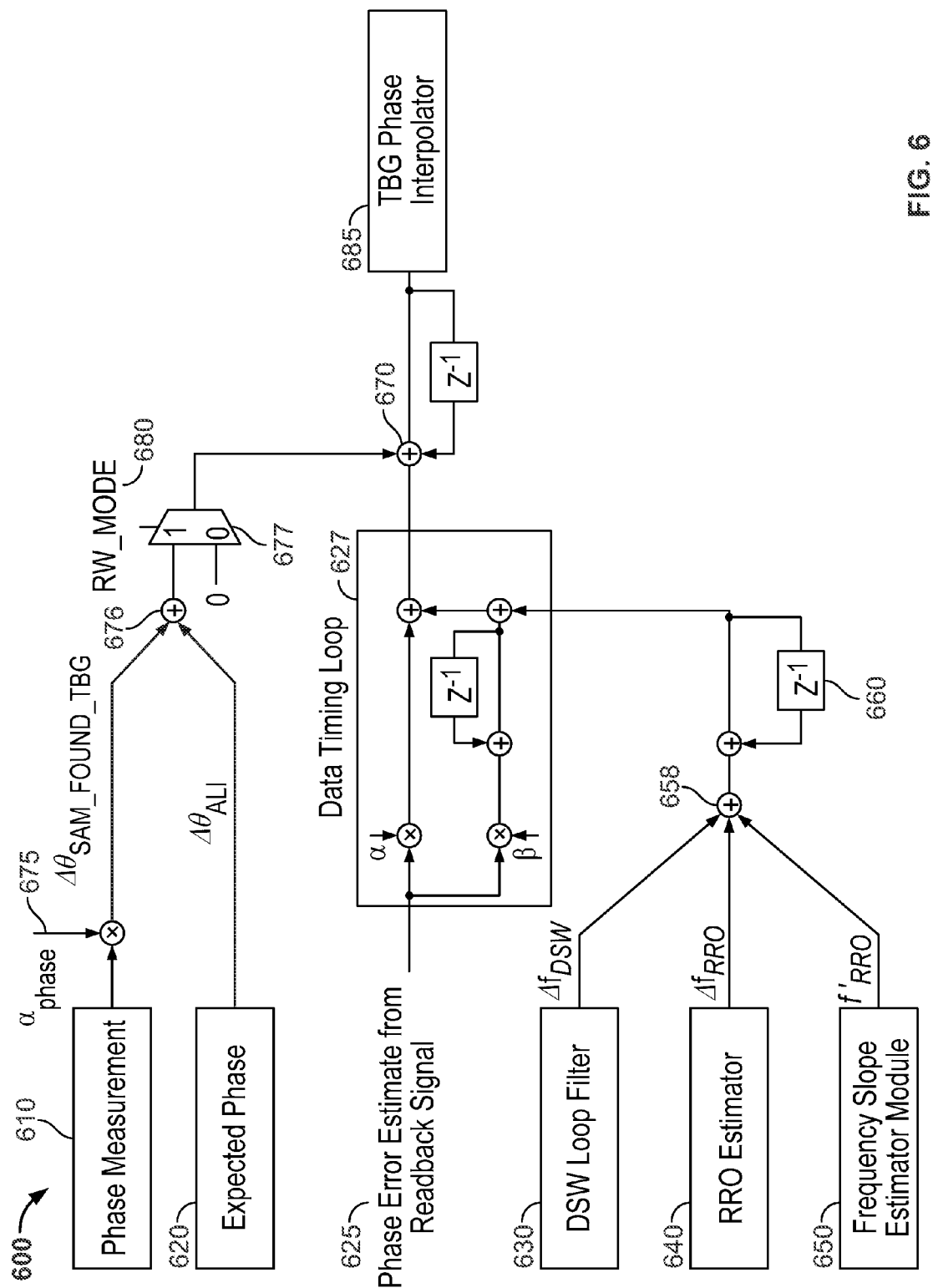
FIG. 6 illustrates a system architecture of circuitry used to adjust the phase of a data clock signal using a data phase interpolator.

FIG. 6 illustrates a system architecture of circuitry used to adjust the phase of a data write clock signal using a phase interpolator 685. The phase interpolator 685 may correspond to the phase interpolator 599 in FIG. 5. In architecture 600, DSW loop filter 630, RRO estimator 640, and frequency slope estimator module 650 are used to determine a frequency error, while phase measurement module 610, expected phase module 620, and the information received via input 625 are used to determine a phase error.

The phase measurement module 610 determines a phase of a data clock signal with respect to the time at which a synchronization mark is asserted. In certain implementations, the expected phase module 620 obtains or otherwise retrieves an expected phase value from storage or from another source. The output of the phase measurement module 610 is normalized according to $\alpha_{phase}$ at multiplier 675, and an estimated phase error is computed at multiplexer 677. Additionally, another estimate of the phase error is determined from a readback signal and provided via the input 625 to data timing loop 627.

The DSW loop filter 630 determines an estimated frequency offset, $\Delta f_{DSW}$, by comparing a time-stamp between synchronization markers in adjacent servo regions to an expected value. In certain implementations, the DSW loop filter 630 provides a frequency offset estimate once per wedge. The RRO estimator 640 determines an estimated frequency offset, $\Delta f_{RRO}$, based on RRO characteristics of the media. For example, RRO estimator may account for periodic irregularities such as disk eccentricity, servo errors, or spindle harmonics. The RRO estimator 640 is implemented in firmware and may use one or more model based processes to produce the value $\Delta f_{RRO}$. RRO estimator provides a new estimate once per wedge.

The frequency slope estimator module 650 determines an instantaneous slope (i.e., rate of change) in frequency offset, referred to as $f'_{RRO}$. The frequency slope estimator module 650 may determine the instantaneous slope using differentiation circuitry, look up tables, and/or any other suitable means.

The outputs of each of the DSW loop filter 630, the RRO estimator 640, and the frequency slope estimator module 650 are combined (e.g., summed) at adder 658 before being provided frequency accumulator module 660. The frequency accumulator module 660 is provided to the data timing loop 627, before being provided to the phase accumulator module 670. Similarly, the output of adder 676 is provided to the phase accumulator module 670 when multiplexer 680 is used with parameter RW_MODE equal to the value 1, and the output of the phase accumulator module 670 is provided to the data clock phase interpolator 685.

The above described arrangements and embodiments are presented for the purposes of illustration and not of limitation. One or more parts of techniques described above may be performed in a different order (or concurrently) and still achieve desirable results. In addition, techniques of the disclosure may be implemented in hardware, such as on an application specific integrated circuit (ASIC) or on a field-programmable gate array (FPGA). The techniques of the disclosure may also be implemented in software.

What is claimed is:

1. Synchronization circuitry comprising:
   frequency offset circuitry configured to produce a frequency offset estimate based, at least in part, on a location of a servo synchronization marker;
   data timing circuitry coupled to the frequency offset circuitry, the data timing circuitry configured to:
      receive the frequency offset estimate from the frequency offset circuitry;
      obtain a phase correction value and a frequency correction value;
      produce a data clock timing control signal based on the frequency offset estimate, the phase correction value, and the frequency correction value; and
      apply the data clock timing control signal to a phase interpolator to modify a phase of a write clock; and
   protocol circuitry configured to change a mode of the synchronization circuitry between a bit-patterned media write mode and a continuous media write mode, wherein in the bit-patterned media write mode, data is written to discontinuous bit islands separated by non-magnetic areas.

2. The synchronization circuitry of claim 1, the frequency offset circuitry further comprising:
   a disk synchronous write loop filter configured to provide a first estimate of the frequency offset;
   a register storing a second estimate of the frequency offset; and
   phase adjustment computation circuitry configured to linearly weigh the first estimate of the frequency offset and the second estimate of the frequency offset to produce the frequency offset estimate.

3. The synchronization circuitry of claim 1, wherein the data clock timing control signal is configured to digitally modify the phase of the write clock.

4. The synchronization circuitry of claim 1 further comprising:
   a plurality of registers, wherein the phase correction value and the frequency correction value are each user-programmable values stored in respective registers in the plurality of registers.

5. The synchronization circuitry of claim 1, wherein the write clock is derived from a voltage controlled oscillator and the data clock timing control signal is configured to digitally adjust a phase associated with the write clock.

6. The synchronization circuitry of claim 1 further comprising:
   a frequency estimation module configured to output a slope value associated with the frequency offset estimate.

7. The synchronization circuitry of claim 1 further comprising:
   calibration circuitry configured to:
      determine a time delay associated with signal propagation through a read path and a write path; and
      update values of the phase correction value and based on the time delay.

8. The synchronization circuitry of claim 7, the calibration circuitry further comprising:
   a calibration switch configured to electrically short a feedback path in a write channel.

9. The synchronization circuitry of claim 1 wherein said protocol circuitry is configured to change the mode of the synchronization circuitry among a type-1 bit-patterned media write mode, a type-2 bit-patterned media write mode, and said continuous media write mode.

10. The synchronization circuitry of claim 1 further comprising:
    a plurality of registers storing a plurality of configuration signals, wherein the synchronization circuitry is configured to apply the plurality of configuration signals to a respective plurality of multiplexers to change the mode of the synchronization circuitry.

11. A method for controlling synchronization of a write clock, the method comprising:
  determining a location of a servo synchronization marker;
  estimating a frequency offset based, at least in part, on the location of the servo synchronization marker to produce a frequency offset estimate;
  obtaining a phase correction value and a frequency correction value associated with the write clock;
  producing a data clock timing control signal based on the frequency offset estimate, the phase correction value, and the frequency correction value;
  applying the data clock timing control signal to a phase interpolator to modify a phase of the write clock; and
  changing an operational mode of the write clock between a bit-patterned media write mode and a continuous media write mode, wherein in the bit-patterned media write mode, data is written to discontinuous bit islands separated by non-magnetic areas.

12. The method of claim 11 further comprising:
  obtaining a first estimate of the frequency offset and a second estimate of the frequency offset, wherein the second estimate of the frequency offset is based on a repeatable run-out model; and
  linearly weighing the first estimate of the frequency offset and the second estimate of the frequency offset to produce the frequency offset estimate.

13. The method of claim 11, further comprising:
  applying the data clock timing control signal to the phase interpolator to digitally modify the phase of the write clock.

14. The method of claim 11 further comprising programmably adjusting a phase correction value and a frequency correction value based on a measured time delay.

15. The method of claim 11 further comprising:
  deriving the write clock from a voltage controlled oscillator; and
  digitally adjusting a phase associated with the write clock based on the data clock timing control signal.

16. The method of claim 11 further comprising determining a slope value associated with the frequency offset estimate.

17. The method of claim 11 further comprising:
  determining a time delay associated with signal propagation through a read path and a write path; and
  updating values of the phase correction value and the frequency correction value based on the time delay.

18. The method of claim 17 further comprising electrically shorting a feedback path in a write channel during a calibration process.

19. The method of claim 11, wherein changing the operational mode of the write clock comprises changing the operational mode among a type-1 bit-patterned media write mode, a type-2 bit-patterned media write mode, and said continuous media write mode.

20. The method of claim 11 further comprising:
  applying a plurality of configuration signals to a respective plurality of multiplexers to adjust the operational mode of the write clock.

* * * * *